United States Patent [19]

Leong et al.

[11] 4,235,989

[45] Nov. 25, 1980

[54] PRODUCTION OF THERMOSETTING PHENOL-FORMALDEHYDE RESINS

[75] Inventors: Sim Y. Leong, Vancouver; Pitchaiya Chandramouli, Richmond; Ramesh C. Vasishth, Delta, all of Canada

[73] Assignee: Cor Tech Research Ltd., Richmond, Canada

[21] Appl. No.: 972,353

[22] Filed: Dec. 22, 1978

Related U.S. Application Data

[63] Continuation of Ser. No. 880,230, Feb. 22, 1978, abandoned, which is a continuation of Ser. No. 779,622, Mar. 21, 1977, abandoned, which is a continuation-in-part of Ser. No. 567,865, Apr. 14, 1975, abandoned.

[51] Int. Cl.³ .............................................. C08G 8/10
[52] U.S. Cl. ................................... 528/139; 260/17.2; 260/29.3; 428/529; 528/144
[58] Field of Search .............................. 528/139, 144

[56] References Cited

U.S. PATENT DOCUMENTS

| | | | |
|---|---|---|---|
| 3,006,893 | 10/1961 | West et al. ...................... | 260/17.2 X |
| 3,422,068 | 1/1969 | Kreibich et al. ................. | 260/29.3 X |
| 3,485,797 | 12/1969 | Robins ............................. | 260/38 X |
| 3,615,975 | 10/1971 | Gillern et al. .................... | 260/831 X |
| 3,773,721 | 11/1973 | Tiedeman ........................ | 260/29.3 X |
| 4,003,873 | 1/1977 | Smith .............................. | 260/38 |
| 4,017,437 | 4/1977 | Vasishth et al. ................. | 260/29.3 |
| 4,022,942 | 5/1977 | Anderson et al. ............... | 260/29.3 |

FOREIGN PATENT DOCUMENTS

927041 5/1973 Canada .

*Primary Examiner*—Howard E. Schain
*Attorney, Agent, or Firm*—Sim & McBurney

[57] ABSTRACT

Thermosetting water-immiscible phenol-formaldehyde resins in which a large proportion of the linkages between the benzene rings are benzyl ether linkages located ortho to the phenolic hydroxyl groups are produced by reaction of at least one mole of formaldehyde with 1 mole of phenol in an aqueous reaction medium in the presence of a metal carboxylate catalyst, such as, zinc acetate. Methods of control of the exothermic addition of formaldehyde to phenol are described.

15 Claims, No Drawings

PRODUCTION OF THERMOSETTING PHENOL-FORMALDEHYDE RESINS

REFERENCE TO RELATED APPLICATION

This application is a continuation of application Ser. No. 880,230 filed Feb. 22, 1978 (now abandoned), which in turn is a continuation of application Ser. No. 779,622 (now abandoned) filed Mar. 21, 1977 which in turn is a continuation-in-part of application Ser. No. 567,865 filed Apr. 14, 1975 (now abandoned).

FIELD OF INVENTION

The present invention relates to the production of thermosetting phenol-formaldehyde resins.

BACKGROUND TO THE INVENTION

Conventional phenol-formaldehyde resins fall into two general classes, namely, the novolacs and the resoles. Novolacs are thermoplastic materials and require the addition of cross-linking agents, such as, hexamethylene tetramine, for curing, whereas resoles are thermosetting materials.

Novolacs are produced by reacting less than one mole of formaldehyde per mole of phenol. In one process, the reaction is carried out under reflux conditions in a strongly acid medium. The product obtained has the structure:

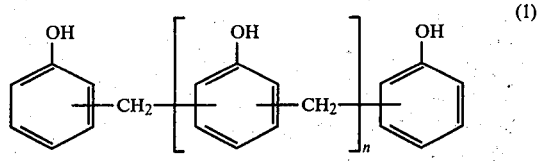

(1)

This material contains methylene linkages which are randomly located ortho and para to the phenolic hydroxyl groups and no reactive end groups, so that the novolacs are thermoplastic and to use them as thermosetting materials, they are compounded with cross-linking agents.

In an alternative procedure for the production of novolac resins, phenol is reacted with formaldehyde in the presence of water-soluble metal carboxylates as catalyst under mildly acid conditions. An intermediate of the following approximate structure is formed:

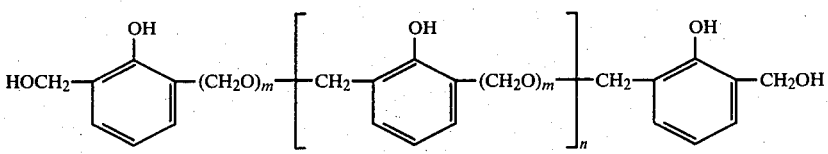

(2)

This intermediate contains benzyl ether linkages which are mainly ortho to the phenolic hydroxyl groups and is produced along with unreacted phenol.

The mixture of intermediate and unreacted phenol then is heated to a temperature above about 160° C. to produce the novolac resin having the structure shown in formula 1, except that the resin has mainly ortho substitution.

Resoles are prepared by reacting more than 1 mole of formaldehyde per mole of phenol in an alkaline reaction medium. The resins produced have the following approximate structure:

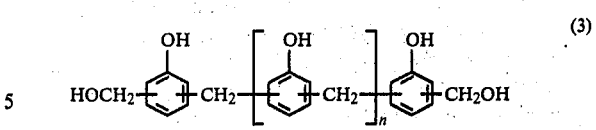

(3)

These materials contain methylene linkages which are randomly located ortho and para to the phenolic hydroxyl groups in the same way as the novolacs of formula 1, but contain reactive end groups, so that the resoles are thermosetting.

Phenol-formaldehyde resins of both types are extensively used industrially owing to their versatility, low cost, extreme stability to weathering, good adhesion to a variety of substrates and stability at relatively high temperatures in the fully cured state.

Resole resins of the above formula (3) in the uncured form have only a limited shelf life and other limitations which have lead to attempts to produce thermosetting phenol-formaldehyde resins of improved properties.

In Canadian Pat. No. 927,041, there is described a procedure for the production of thermosetting phenol-formaldehyde resins by reacting formaldehyde with phenol at a mole ratio of at least 1:1 in an essentially aqueous reaction medium in the presence of a water-soluble metal carboxylate catalyst. The product resin has a long shelflife and is characterized by a structure in which a large proportion of the benzene ring linkages are benzyl ether linkages located ortho to the phenolic hydroxyl groups, i.e. a structure very similar to the intermediate of formula 2 formed in novolac production, that is, even when less than one mole of formaldehyde per mole phenol is used.

Two distinct steps are required in the formation of resins of the resole type and of the latter type. The first step is the exothermic addition of formaldehyde to phenol to form methylol phenol ("methylolation") and the second step is the polymerization of the methylol phenol by condensation to form the thermosetting resin.

While the two steps are common to the two processes, the precise chemical reactions are quite different. Thus, while the addition of formaldehyde to phenol in the conventional resole process produces a randomly substituted ortho- and para-methylol phenol, the addition step in the procedure of Canadian Pat. No. 927,041 produces mainly ortho-substituted methylol phenol. Similarly, while the polymerization step in the conventional resole process produces a product with methylene linkages between the benzene rings, the polymerization step in the process of Canadian Pat. No. 927,041 produces a resin in which a large proportion of the methylene linkages are replaced by benzyl ether linkages. Since the chemical reactions occurring are different, processing variables affecting one process do not necessarily affect the other process in the same manner.

In Canadian Pat. No. 927,041, it is recited that the procedure for the production of the resin must be carried out in a particular manner. Thus, it is said that it is essential to the process of Canadian Pat. No. 927,041 to carry out the process at a temperature between about 60° and about 80° C. during the initial exothermic reaction of formaldehyde with phenol in order to control and dissipate the considerable exotherm and prevent a runaway reaction. Once the exotherm has subsided, the reaction mixture is heated to about 90° to 100° C., typically at about 90° C., to carry out the polymerization step and form the desired product.

SUMMARY OF INVENTION

It has now been found that it is possible to control the intensity of the exotherm generated in the initial methylolation reaction of formaldehyde with phenol by varying certain parameters, so that at least the methylolation step of the resin-forming process of Canadian Pat. No. 927,041 may be carried out wholly at a temperature above about 90° C., preferably at the reflux temperature of the system (generally about 100° C.), rather than by the two-step process of the Canadian patent.

This invention, therefore, is directed to controlling the exotherm generated by the reaction of formaldehyde with phenol at any mole ratio below 3:1 in an aqueous reaction medium containing a metal carboxylate catalyst to enable at least the methylolation step, and preferably both steps of, the resin-forming process to be carried out wholly at a temperature above about 90° C., preferably substantially at the reflux temperature of the system, to produce a water-immiscible thermosetting phenol-formaldehyde resin in which a large proportion of the benzene ring linkages are benzyl ether linkages located ortho to the phenolic hydroxyl groups.

GENERAL DESCRIPTION OF INVENTION

The following parameters may be varied independently or in combination to achieve the exotherm control in accordance with this invention:
(a) initial pH of the reaction mixture;
(b) catalyst concentration in the reaction mixture;
(c) concentration of methanol in the reaction mixture;
(d) overall solids loading of the reaction mixture; and
(e) mode of feed of formaldehyde to the reaction mixture.

The process of production of the resin is carried out over a pH range of reaction mixture of about 3 to about 6.9, preferably about 4 to about 6.5. Over this range of initial pH values, the intensity of the exotherm decreases with decreasing (i.e. more acid) pH values.

Adjustment of the natural pH of a given reaction mixture for the desired exotherm control may be achieved by utilization of any suitable inorganic or organic acid or alkali.

This decreasing exotherm intensity with decreasing pH, even when the pH is decreased to below a pH of 4, contrasts markedly with the observed changes of exotherm intensity with pH in conventional resole production, in which the rate of reaction is known to be at a minimum at about pH4.

The concentration of catalyst used in the reaction mixture is at least about 1% by weight of the mixture. It has been found that the intensity of the exotherm increases with increasing concentrations of catalyst, although the change in increase of intensity becomes less marked as the concentration increases, and it is preferred for this reason to use less than about 10% by weight of catalyst based on the reaction mixture, although up to 20% or more by weight of catalyst may be used.

It should be noted that in conventional resole resin production, the quantity of alkaline catalyst used is based on the weight of phenol at differing mole ratios of phenol to formaldehyde, to obtain an equivalent effect, whereas in the system of the present invention, the total weight of the reaction mixture is the correct basis for determination of the catalyst concentration, irrespective of the mole ratio of phenol to formaldehyde.

Given the conventional resole resin basis, when the catalyst amount used is calculated as a percentage of the phenol, it may be thought that mole ratio of phenol to formaldehyde influences the intensity of the exotherm. This appears to be so as increasing mole ratio of phenol to formaldehyde with the same catalyst concentration based on phenol results in a decreased intensity of exotherm. However, it has now been found that this decreased exotherm is due to decreased catalyst concentration in the total reaction mixture on increasing the mole ratio. Thus, given the same total reactant concentration and absolute catalyst concentration in the reaction mixture, mole ratio of phenol to formaldehyde has little or no effect on the exotherm intensity.

Thus, upon changing the mole ratio of formaldehyde to phenol from about 1.5:1 to about 1.8:1 at the same overall solids concentration and with the same weight of catalyst based on phenol, the overall concentration of catalyst decreases and the exotherm also decreases. However, when the overall catalyst concentration at the higher mole ratio is adjusted to the same value as that at the lower mole ratio, the intensity of the exotherm is substantially the same.

Methanol concentration in the reaction mixture also influences the intensity of the exotherm. Thus, increasing concentration of methanol in the reaction mixture results in decreasing exotherm intensity. Methanol often is present in formaldehyde and therefore in the reaction mixture and such methanol will exercise some degree of exotherm control, depending on the resulting overall methanol concentration. Methanol also may be added to the reaction mixture to provide the desired concentration. Quantities of methanol which may be used range from 0 up to about 15% by weight of the reaction mixture.

It was previously thought that the presence of high methanol concentrations in the initial reaction mixture leads to the productions of resins more resistant to emulsification than those produced at lower initial methanol concentrations. However, these observations were made with respect to resins having differing end viscosities, the resins produced at higher methanol concentrations having a lower viscosity. It is now known that if the resins have approximately the same end viscosity, typically greater than about 1000 cps at 50° C., then the initial methanol concentration of the reaction mixture has little or no effect on the emulsifiability of the resin.

Formaldehyde also usually contains small quantities of formic acid which will increase the overall acidity of the initial reaction mixture, thereby further decreasing the intensity of the exotherm. Compensation for the formic acid may be achieved by addition of suitable alkali to the reaction mixture or by increasing the catalyst concentration.

Since it is generally desired to operate the resin-forming process at as high a concentration as practical in order to achieve maximum output per unit reactor capacity with the aqueous phase being introduced solely with the formaldehyde feed, it is preferred to use a reaction mixture having a high solids loading, up to about 65 to 72% by weight and utilize pH, catalyst concentration and/or methanol concentration variations to control the exotherm intensity. Dilution of the reaction mixture, however, also may be used to control the exotherm intensity and solid loading concentrations of about 45 to about 58% by weight, preferably about 52 to about 56% by weight, may be used to achieve a one-step process. The lower concentrations are generally preferred where an economic semicontinuous process as outlined below is to be used.

The heating of the reaction medium after completion of the methylolation stage is carried out until a water-immiscible resin phase separates from the aqueous phase. The heating is further continued after such phase separation until a resin of approximately the desired viscosity is obtained. The resin phase then is removed from the aqueous phases.

Alternatively, the resin phase may be removed from the aqueous phase at any time after the initial phase separation and up to the achievement of the desired viscosity, and the resin phase then heated in the absence of the aqueous phase at a temperature below its thermosetting temperature to increase the viscosity to the desired value, for example, in the temperature range of about 60° to about 120° C.

In either case, the separated aqueous phase contains unreacted phenol, dissolved low molecular weight resins and catalyst. To avoid the economic penalty of loss of these materials, their reuse in another resin-forming reaction mixture is desirable. The volume of the aqueous phase first is decreased and then recycled. Water introduced to the system with the formaldehyde (usually as an about 37 to 45% by weight solution), and any other water addition results in a reaction mixture having a solids concentration in the range of about 45% to about 58% by weight.

In a preferred embodiment of the invention, the initial reaction mixture possesses the following characteristics:

| | |
|---|---|
| Mole ratio of formaldehyde to phenol | 1.8 to 2.0:1 |
| pH | 5.8 |
| Catalyst concentration: | 2.6 wt. % |
| Solids concentration | 54 wt. % |
| Methanol concentration | <1 wt. % |

It is usual to charge the reactor initially with all the phenol and formaldehyde desired to be co-reacted and then carry out the resin-forming process in batch manner using such initial charge. Another method of controlling the intensity of the exotherm of the methylolation reaction is to charge the reactor initially with only part of the formaldehyde to be reacted, heat the reaction mixture to above about 90° C. and then slowly feed the remainder of the formaldehyde into the reactor while maintaining the reaction mixture at a temperature above about 90° C. by controlling the rate of formaldehyde addition and the rate of heating.

In accordance with this invention, therefore, several parameters may be used singly or in combination, to enable the intensity of the methylolation reaction to be controlled so that at least the methylolation reaction, and preferably the whole resin-forming procedure, may be carried out at a temperature wholly above about 90° C., in contrast to the indicated necessity to limit the temperature in the methylolation reaction step to the range of about 60° to about 80° C. in Canadian Pat. No. 927,041.

In one procedure according to the invention, the reaction mixture is heated to commence the exothermic reaction above about 90° C., the temperature of the reaction mixture is increased to the reflux temperature of the reaction medium at atmospheric pressure at least in part through the effect of the exothermic heat, and the resin-forming process is completed under such reflux.

The mole ratio of formaldehyde to phenol used to form the thermosetting, water-immiscible resins in this invention is at least 1:1, generally up to about 3:1. Since the quantity of unreacted phenol after completion of the reaction has been found to be greater at lower mole ratios, it is generally preferred to use higher mole ratios, greater than about 1.5:1 up to about 3:1, such as in the range of about 1.5:1 to about 2.5:1, and typically in excess of about 1.7:1., to achieve economic reactant utilization.

The metal carboxylate catalyst used to form the thermosetting water-immiscible resins in which a large proportion of the linkages between the benzene rings are benzyl ether linkages located ortho to the phenolic hydroxyl groups in this invention is a water-soluble salt of an organic monocarboxylic acid with a metal of the transition elements of the Periodic Chart of Elements. Such salts may be represented by the formula:

$$(C_nH_{2n+1}COO)_xM$$

where n is an integer from 0 to 10, x is greater than 1 and M is a metal having an atomic number from 21 to 30.

Typical acid moieties of the catalysts include formic acid, acetic acid and propionic acid. Typical metals include zinc, manganese, cobalt, nickel, iron and chromium. Zinc acetate and cobalt acetate are preferred catalysts.

EXAMPLES

EXAMPLE 1

This example illustrates the formation of a water-immiscible phenol-formaldehyde resin using the procedure of the present invention.

In a glass reaction vessel equipped with an agitator, reflux condenser and a thermometer were charged 1794.1 grams (19.09 moles) of phenol, 2783.3 grams (34.35 moles) of formaldehyde having a methanol content of less than 1.5 weight % (corresponding to formaldehyde to phenol mole ratio of 1.8:1), 144.8 grams (0.034 moles) of zinc acetate dihydrate and 772.8 grams of water to provide a reaction mixture having a total reactants concentration of 54% by weight, an absolute catalyst concentration of about 2.6% by weight of the total reaction mixture and a pH of 5.8.

The mixture was heated to 90° C. in about 40 to 45 minutes. The temperature was raised further to reflux at approximately 100° C. over the next 15 minutes by controlling the rate of heating. The reaction mixture was kept under constant reflux for a total time for commencement of reflux of 210 minutes. About 105 minutes after commencement of the reflux began, a distinct phase separation was observed.

After the completion of the reflux period, the reaction mixture was cooled to 35° C. and the agitation stopped. Cooling was then continued to about 25° C. The liquid resin phase was separated from the aqueous phase. The resin was found to have a Brookfield viscosity of 2000 to 2300 cps at 120° F. (50° C.) and an N.V. solids content of 75 to 80%.

Infra-red and NMR spectral analysis indicated the resin to contain benzyl ether linkages ortho to the phenolic hydroxyl groups and large quantities of hemiformal groups.

EXAMPLE 2

This example illustrates the change in exotherm intensity with reactants concentration.

Phenol-formaldehyde resins were formed following the procedure of Example 1 at varying reactant concentrations using a mole ratio of formaldehyde to phenol of 1.5:1 and a concentration of zinc acetate of 8% by weight based on phenol. In each case, the reaction medium was heated to 90° C. over a period of approximately 30 minutes and the heat was removed at that temperature. The times taken for the reaction mixture to reach reflux temperature as a result of the exotherm were observed. No attempt was made to complete the formation of the resin by refluxing upon decline of the exotherm. The results are reproduced in the following Table I:

TALBE I

| Reactant Concentration | 71.9 | 65.7 | 60.0 | 55.0 | 50.0 | 45.0 |
|---|---|---|---|---|---|---|
| Time to reflux (mins) | 8 | 13 | 16 | 20 | * | * |

*A reflux temperature was not attained.

The results of the above Table I indicate that the intensity of the exotherm, as measured by the time that the reaction mixture took to reach reflux, decreased with decreasing reactants concentration. It will be noted that in this Example, in each case the quantity of catalyst was based on phenol, so that as the solids concentration decreased, the overall catalyst concentration also decreased, so that at least some of the effect observed is due to a decreased overall catalyst concentration.

EXAMPLE 3

This example illustrates the change in exotherm intensity with catalyst concentration, pH, reaction mixture concentration and methanol concentration.

Phenol-formaldehyde resins were formed following the procedure of Example I under differing sets of conditions in which one of the variables of catalyst concentration, pH, reaction mixture concentration and methanol concentration while the others of the variables were held constant.

In each case, the reaction medium was heated to 90° C. over a period of about 30 minutes and the heat was removed at that temperature. The times taken for the reaction mixture to reach reflux temperature as a result of the exotherm were observed. No attempt was made to complete the formation of the resin by refluxing upon decline of the exotherm.

The results are set forth below:

| (a) Variable studied: | Catalyst concentrations in initial reaction mixture | |
|---|---|---|
| Variables held constant: | pH of initial reaction mixture | 5.8 |
| | reaction mixture concentration | 54% |
| | methanol concentration in reaction mixture | <0.5 wt. % |

TABLE II

| Catalyst concentration (wt. %) | 2 | 2.1 | 2.4 | 2.6 | 7.2 |
|---|---|---|---|---|---|
| Time to reflux (mins.) | 17 | 15 | 13 | 12 | 10 |

It will be seen from the results of Table II that as the catalyst concentration increases the intensity of the exotherm increases.

| (b) Variable studied: | pH of initial reaction mixture | |
|---|---|---|
| Variables held constant: | catalyst concentration in initial reaction mixture | 2.6 wt. % |
| | reaction mixture concentration: | 56 wt. % |
| | methanol concentration of initial reaction mixture: | <0.5 wt. % |

TABLE III

| pH | 6.9 | 5.8 | 4.5 | 4 | 2.7 |
|---|---|---|---|---|---|
| Time to reflux (mins) | 7 | 13 | * | * | * |

*No reflux was attained.

The results of the above Table III show that the intensity of the exotherm declines with increasingly acid pH values.

| (c) Variable studied: | reaction mixture concentration | |
|---|---|---|
| Variables held constant: | catalyst concentration in initial reaction mixture: | 2.6 wt. % |
| | pH of initial reaction mixture | 5.8 |
| | methanol concentration of initial reaction mixture: | <0.5 wt. % |

TABLE IV

| Reaction mixture concentration (wt. %) | 71 | 65 | 54 | 30 |
|---|---|---|---|---|
| Time to reflux (mins) | 4 | 6 | 12.5 | * |

*Reflux was not attained

As may be seen from the results of the above Table IV, as the reaction mixture concentration decreases, the intensity of the exotherm declines.

| (d) Variable studied: | methanol concentration in initial reaction mixture | |
|---|---|---|
| Variables held constant: | catalyst concentration in initial reaction mixture | 2.6 wt. % |
| | pH | 5.8 |
| | Reaction mixture concentration | 54 wt. % |

TABLE V

| Methanol concentration (wt. %) | 0.5 | 1.5 | 5 | 10 |
|---|---|---|---|---|
| Time to reflux (mins) | 13 | 18 | — | — |

The results of the above Table V show that the intensity of the exotherm declines with increasing methanol concentration in the initial reaction mixture.

The results of the above Tables II to V demonstrate that the parameters of catalyst concentration, pH, reaction mixture concentration and methanol concentration may be varied independently, or in combination, to control the intensity of the exotherm.

The results indicated in this Example and in Example 2 are those obtained using a particular piece of equipment. While the precise numerical values recited may not be identically reproducable with other equipment, the trends shown by the results nevertheless will be reproduced with such other equipment.

EXAMPLE 4

This example illustrates the change in exotherm intensity with manner of feed of formaldehyde.

The procedure of Example 1 was repeated at an overall mole ratio of formaldehyde to phenol of 2:1, but in this case one third only of the total quantity of formaldehyde (as a 47% aqueous solution thereof) was charged to the initial reaction mixture. The initial reaction mixture had a total solids loading of 54 wt%, a zinc acetate concentration of 2.68 wt%, a methanol concentration of 2.25 wt%, and a pH of 5.7.

The reaction mixture was heated steadily to reflux in about 37 minutes without observing a substantial exotherm. The remaining two-thirds of the formaldehyde was fed to the reaction mixture at the reflux temperature as a 47% aqueous solution thereof over a period of 42 minutes while the reaction mixture was continued to be heated.

In a comparative experiment in which all the formaldehyde reactant was fed initially to the reaction mixture, it was necessary to shut off the heat at a temperature of 95° C. and allow the exotherm to take the reaction mixture to the reflux temperature, in a period of about 5 minutes.

EXAMPLE 5

This example illustrates the thermosetting nature of resins produced according to this invention.

A series of water-immiscible resins of varying viscosity were prepared following generally the procedure of Example 1 using various combinations of mole ratios of formaldehyde to phenol of 1.1:1 to 3:1, initial reaction mixture catalyst concentrations of 1 to 20% by weight, initial reaction mixture methanol concentration of from 0 to 15% by weight, and initial pH values 3 to 6.9. In each case, the resins were found to be thermosetting as shown by their conversion to a brittle insoluble state in a short period of time when placed on a hot plate at about 160° C.

EXAMPLE 6

This example illustrates the adhesive properties of resins formed by the procedure of the present invention in rice husk board manufacture.

A resin was prepared following the procedure outlined in Example 1 and having a Brookfield viscosity at 75° F. (20° C.) of about 2200 cps. To this resin was added 5% by weight of a 50% solution of paratoluene sulphonic acid and a rice husk board was formed from the acid catalysed resin using about 10% resin solids. The boards were pressed to a density of 50 lbs. per cubic foot and a half inch thickness at 390° F. for 11 minutes. The internal bond strength of the board was found to be 86 psi and any value greater than 80 psi is considered satisfactory.

EXAMPLE 7

This example illustrates the adhesive properties of resins formed by the procedure of the present invention in particle board and waferboard manufacture.

(a) Particle board

A water-immiscible phenol-formaldehyde resin formed by the process of Example 1 and having a viscosity of about 1000 cps at 50° C. was applied at a rate of 8% by weight of dry wood chips to pine chips of 6 to 8% moisture content and the coated chips were dried to a moisture content of 4%.

Thereafter a board of ½ inch thickness and density of 45 lb. per cu.ft. was formed from the coated chips at a press time of 6 mins. at 400° F. The boards were found to have a modulus of rupture of 4840 psi (as compared to about 2600 psi for conventional particle board) and an internal bond strength of 278 psi (as compared to about 120 to 130 psi for conventional particle board).

(b) Waferboard

A water-immiscible phenol-formaldehyde resin formed by the process of Example 1 and having a viscosity of about 1000 cps at 50° C. was emulsified to obtain an emulsion having a resin concentration of 46% by weight, and applied at a rate of 3% by weight of resin on the weight of dry wood wafers to wafers of about 9.5% moisture content.

The coated wafers were pressed into a board of thickness of about 0.3 inches and density of 31.9 lb. per cu.ft. (low density) at a temperature of about 400° F. with a press time of 5.5 minutes. The resulting boards exhibited a modulus of rupture of 3,369 psi (as compared to about 2,500 psi for conventional waferboard) and an internal bond strength of 49.3 psi (as compared with about 35 psi for conventional waferboard).

The results contained in this Example and in Example 6 show the effectiveness of resins produced according to this invention in adhesive applications.

SUMMARY

The present invention, therefore, is directed to improved procedures for forming water-immiscible phenol-formaldehyde resins. Modifications are possible within the scope of the invention.

What we claim is:

1. A process for the production of a water-immiscible thermosetting phenol-formaldehyde resin characterized by a large proportion of the linkages between the benzene rings being benzyl ether linkages located ortho to the phenolic hydroxyl groups, which comprises:

forming an essentially aqueous reaction medium containing formaldehyde and phenol at a mole ratio of about 1.5:1 to about 3.0:1, and at least one water-soluble metal carboxylate catalyst which is a water-soluble salt of an organic monocarboxylic acid with a metal of the transition elements of the Periodic Chart of Elements represented by the formula:

$$(C_nH_{2n+1}COO)_xM$$

wherein n is an integer from 0 to 10, x is greater than 1 and M is a metal having an atomic number from 21 to 30, said reaction medium having an initial total reactants concentration of about 45 to about 58% by weight, heating said reaction medium to a temperature of at least about 90° C. to initiate reaction between said phenol and formaldehyde in said reaction zone above said temperature, increasing the temperature of said reaction medium to the reflux temperature of said reaction medium, maintaining said reaction medium at its reflux temperature until a water-immiscible phenol-formaldehyde resin phase separates from said aqueous reaction medium and a resin phase having a viscosity of at least about 1000 cps at 50° C. is achieved, and recovering the water-immiscible resin phase from the aqueous phase, whereby said resin-forming process is effected substantially wholly at a temperature of at least about 90° C. up to the reflux temperature of said reaction medium.

2. The process of claim 1 wherein said mole ratio of formaldehyde to phenol is about 1.5:1 to about 2.5:1.

3. The process of claim 1, wherein said mole ratio of formaldehyde to phenol is about 1.8:1 to about 3.0:1.

4. The process of claim 1, wherein said catalyst is zinc acetate.

5. The process of claim 1 wherein said total reactants concentration is about 52 to about 56% by weight.

6. A process for the production of a water-immiscible thermosetting phenol-formaldehyde resin characterized by a large proportion of the linkages between the benzene rings being benzyl ether linkages located ortho to the phenolic hydroxyl groups, which comprises reacting formaldehyde with phenol in an essentially aqueous reaction medium containing at least one water-soluble metal carboxylate catalyst for the reaction which is a water-soluble salt of an organic monocarboxylic acid with a metal of the transition elements of the Periodic Chart of Elements represented by the formula:

$(C_nH_{2n+1}COO)_xH$ wherein n is an integer from 0 to 10, x is greater than 1 and M is a metal having an atomic number from 21 to 30, said reaction medium initially possessing the following characteristics:

| mole ratio of formaldehyde to phenol | = | 1.8:1 to 2.0:1 |
| pH | = | 5.8 |
| catalyst concentration | = | 2.6 wt % |
| solids concentration | = | 54 wt % |
| methanol concentration | = | <1 wt % | said process being effected in two stages wherein, in the first stage, exothermic methylolation of phenol by formaldehyde occurs wholly at a temperature of at least about 90° C. up to the reflux temperature of the reaction mixture, and, in the second stage, polymerization of the methylolated phenol occurs at least until there separates from the aqueous medium a water-immiscible thermosetting phenol-formaldehyde resin characterized by a large proportion of the linkages between benzene rings being benzyl ether linkages located ortho to the phenolic hydroxyl groups, and recovering the resin phase from the aqueous phase, the polymerization being effected until the resin phase attains a viscosity of at least about 1000 cps at 50° C.

7. A process for the production of a water-immiscible thermosetting phenol-formaldehyde resin characterized by a large proportion of the linkages between the benzene rings being benzyl ether linkages located ortho to the phenolic hydroxyl groups, which comprises:

reacting formaldehyde with phenol in an essentially aqueous reaction medium containing at least one water-soluble metal carboxylate catalyst for the reaction which is a water-soluble salt of an organic monocarboxylic acid with a metal of the transition elements of the Periodic Chart of Elements represented by the formula:

$(C_nH_{2n+1}COO)_xH$ wherein n is an integer from 0 to 10, x is greater than 1 and M is a metal having an atomic number from 21 to 30, said reaction medium initially possessing the following characteristics:

| mole ratio of formaldehyde to phenol | - | 1.5:1 to 3.0:1 |
| pH | - | about 3 to about 6.9 |
| catalyst concentration | - | about 1 to about 10 wt % |
| solids concentration | - | about 45 to about 58 wt % |
| methanol concentration | - | 0 to about 15 wt % | said process being effected in two stages, wherein, in the first stage, exothermic methylolation of phenol by formaldehyde occurs wholly at a temperature of at least about 90° C. up to the reflux temperature of the reaction mixture, and, in the second stage, polymerization of the methylolated phenol occurs at least until there separates from the aqueous medium a water-immiscible thermosetting phenol-formaldehyde resin characterized by a large proportion of the linkages between benzene rings being benzyl ether linkages located ortho to the phenolic hydroxyl groups, and recovering the resin phase from the aqueous phase, the polymerization being effected until the resin phase attains a viscosity of at least about 1000 cps at 50° C.

8. The process of claim 7, wherein the characteristics of the initial reaction medium are:

| mole ratio of formaldehyde to phenol | - | 1.8:1 to 2.0:1 |
| pH | - | about 4 to about 6.5 |
| catalyst concentration | - | about 1 to about 10 wt % |
| solids concentration | - | about 52 to about 56 wt % |
| methanol concentration | - | 0 to about 15 wt % |

9. The process of claim 7, wherein the catalyst is zinc acetate.

10. The process of claim 7 wherein said reaction is carried out by heating the reaction medium to a temperature of at least about 90° C. to initiate said exothermic reaction above that temperature, increasing the temperature in controlled manner to the reflux temperature of said reaction medium, and maintaining said reaction medium at an elevated temperature at least until said resin phase separates from said aqueous phase.

11. The process of claim 7, wherein said reaction medium is maintained at the elevated temperature until the resin phase achieves said viscosity value of at least about 1000 cps at 50° C., and thereafter said recovery of resin phase from aqueous phase occurs after said viscosity value has been attained.

12. The process of claim 7, wherein said recovery of resin phase from aqueous phase occurs after said phase separation and while said resin phase has a viscosity value of less than about 1000 cps at 50° C., and said recovered resin phase is heated to a temperature below its thermosetting temperature to increase the viscosity thereof to said value of at least about 1000 cps at 50° C.

13. The process of claim 7 wherein said formaldehyde is fed as a single charge to said reaction medium.

14. The process of claim 7 wherein part only of said formaldehyde is fed initially to the reaction medium and the remainder is added to said reaction medium during said methylolation reaction.

15. The process of claim 7 wherein the formaldehyde is charged to the reaction mixture as an aqueous solution thereof having a concentration of about 37 to about 45% by weight.

* * * * *